Feb. 6, 1945.    E. BOECKING    2,368,634
LENS MOUNT AND FILM GATE CONSTRUCTION FOR
MOTION PICTURE PROJECTION MACHINES
Original Filed May 31, 1941    3 Sheets-Sheet 2
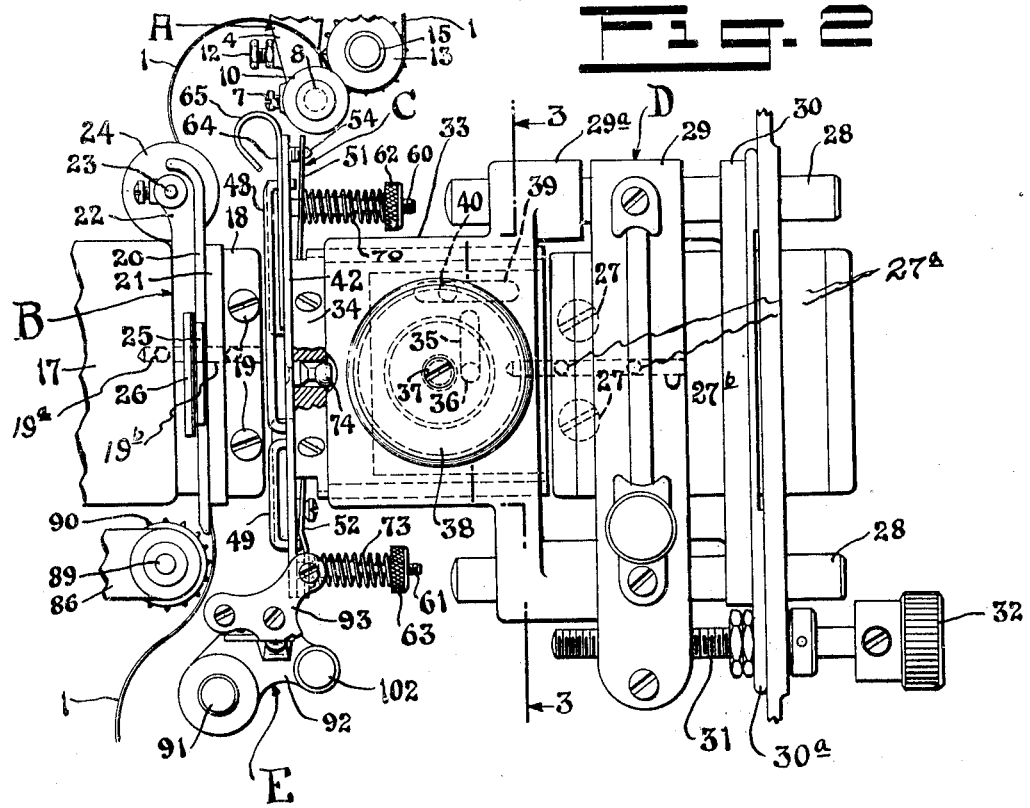
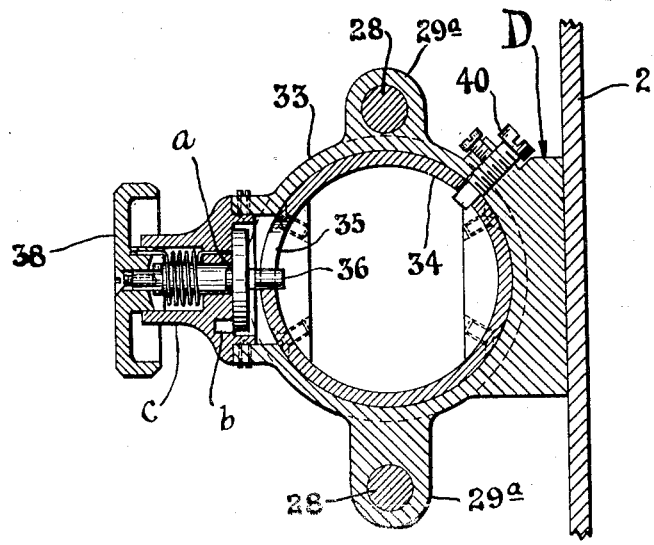
INVENTOR
EWALD BOECKING
Darby + Darby
ATTORNEYS Feb. 6, 1945. E. BOECKING 2,368,634
LENS MOUNT AND FILM GATE CONSTRUCTION FOR
MOTION PICTURE PROJECTION MACHINES
Original Filed May 31, 1941 3 Sheets-Sheet 3
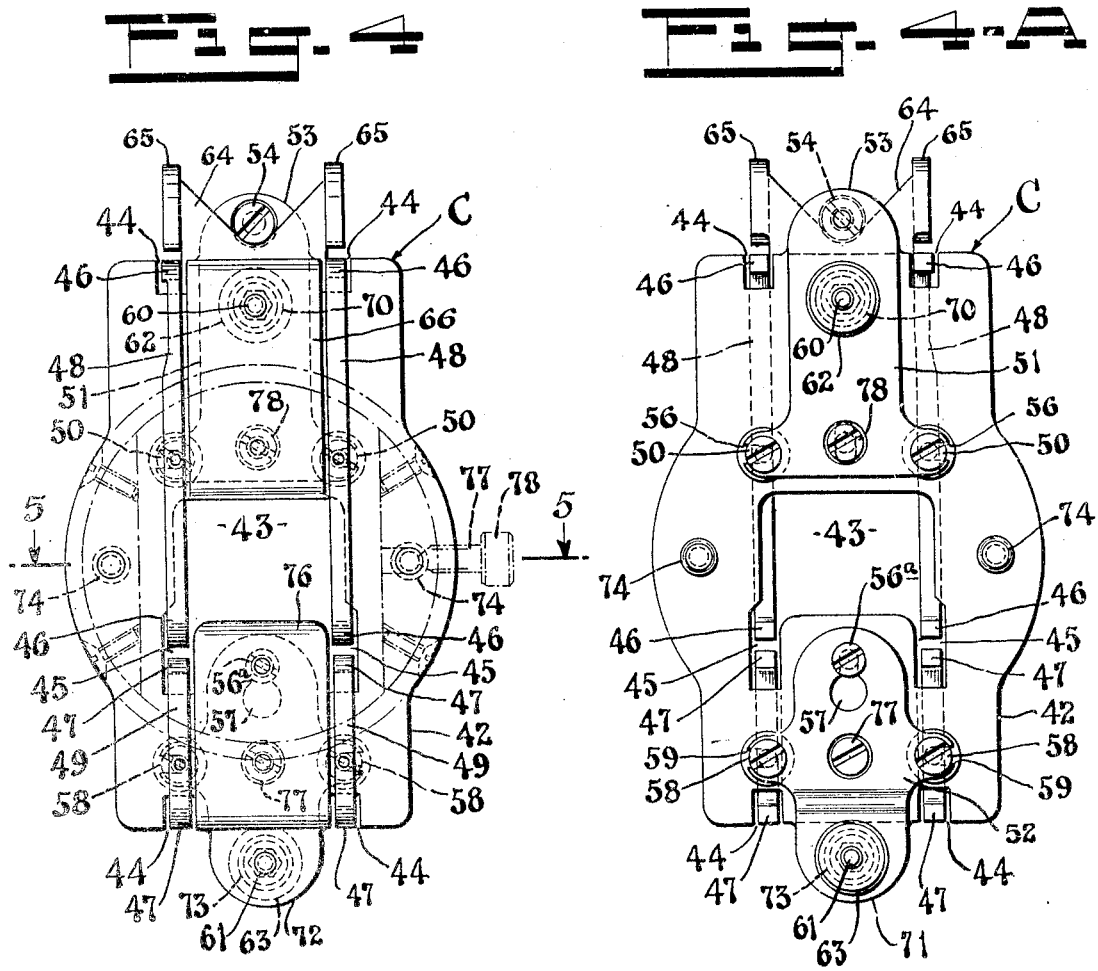
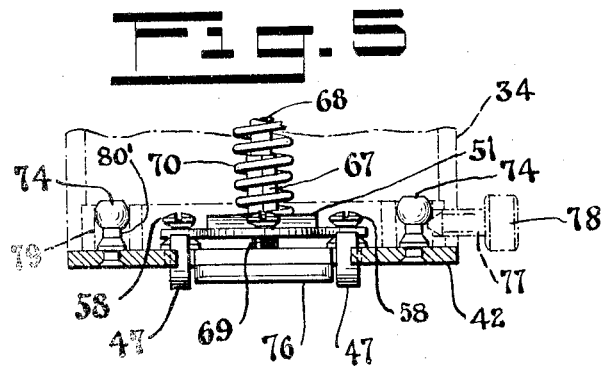
INVENTOR
EWALD BOECKING
Darby & Darby
ATTORNEYS Patented Feb. 6, 1945

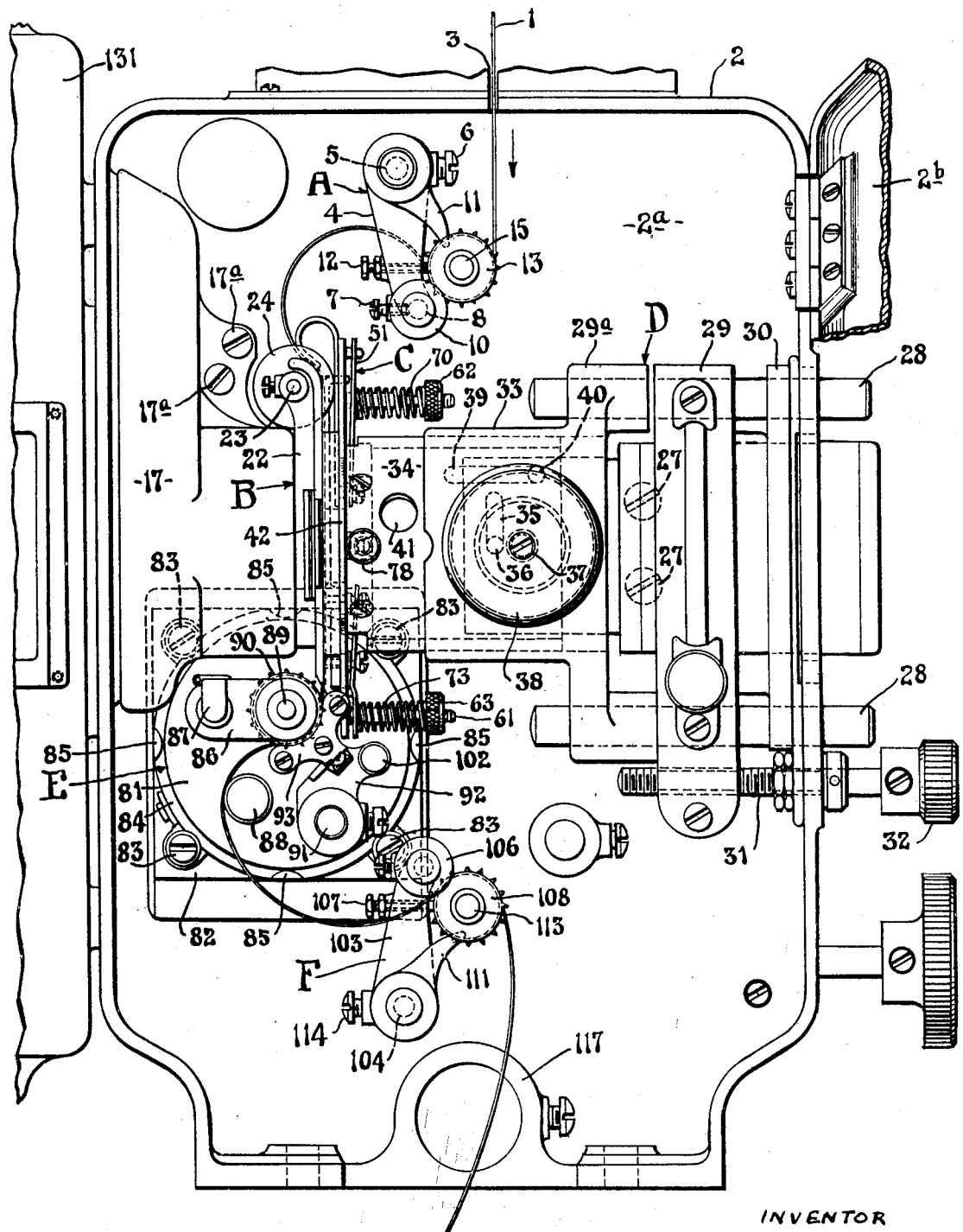

2,368,634

UNITED STATES PATENT OFFICE 2,368,634

LENS MOUNT AND FILM GATE CONSTRUCTION FOR MOTION-PICTURE PROJECTION MACHINES

Ewald Boecking, Great Kills, Staten Island, N. Y., assignor to Century Projector Corporation, Brooklyn, N. Y., a corporation of New York Original application May 31, 1941, Serial No. 396,060. Divided and this application January 15, 1942, Serial No. 426,848

18 Claims. (Cl. 88—17)

This application is a division of my copending application Serial No. 396,060, filed May 31, 1941. The improved lens mount and film gate construction comprising the invention described and claimed herein may be used in connection with the motion picture projection machines of the type described in said above referred to application, and also in other similar types of machines.

The invention relates to a new and improved construction for the lens mount and the film gate structures of motion picture projection machines.

The main object of the invention is to provide an improved construction for the lens mount and for the film gate structures of a motion picture projection machine.

A further object is to provide a new and improved film gate construction for a motion picture projection machine and, one which may be quickly and easily placed as a unit in operative position or removed from the machine.

A further object is to provide a novel form of focusing means for the lens of a motion picture projection machine and also an improved support for the lens mount.

A further object is to provide a novel means for centering or adjusting the film gate so that it will be in correct line-up with the film passing through the film trap of the machine.

A further object is to provide new and novel means for opening and closing the film gate with respect to the film trap of the machine.

A further object is to provide a new and improved combined support for the film gate and the lens mount which may be quickly and easily removed as a unit from the machine or replaced therein.

Various other objects of the invention will be apparent from the following description taken in connection with the accompanying drawings.

Although the novel features of the invention will be particularly pointed out in the claims, the invention itself, as to its objects and advantages, may be better understood by referring to the following description taken in connection with the accompanying drawings forming a part thereof and in which Figure 1 is a side elevation of the interior of that side of a motion picture projection machine which supports the film handling elements of the machine and showing the improved lens mount and film gate construction of my invention in position with respect to the other mechanism;

Figure 2 is a side elevation of the lens mount and film gate, and their common support.

Figure 3 is a sectional view of Figure 2 taken on the line 3—3 of said figure, looking in the direction of the arrows.

Figure 4 is a front elevational view of the film gate.

Figure 4A is a rear elevational view of the film gate.

Figure 5 is a sectional view of Figure 4 taken on the line 5—5 of said figure, looking in the direction of the arrows.

Like reference characters denote like parts in the several figures of the drawings.

My improved lens mount and film gate construction and the common support therefor may be employed in a motion picture projection machine of the character illustrated in Figure 1 of the drawings. Referring to this figure, it will be seen that the machine, on the side thereof which houses the film handling elements, is provided with the following main assemblies of operating mechanisms. The upper film sprocket and stripper mechanism of the machine is designated generally by the letter A; the film trap is indicated at B; the film gate at C; the lens mount and film gate supporting means at D; the intermittent film feeding mechanism at E; and the lower sprocket and stripper mechanism at F.

In the normal operation of the machine containing my improved mechanisms therein, the film indicated at 1 is fed into the machine through an opening 3 provided in the top of the casing 2, and passes around the upper sprocket 13 of the sprocket and stripper mechanism A, then down through the film trap B, and between said film trap and the film gate C, then around the sprocket 90 of the intermittent film feeding mechanism E, then around the lower sprocket 108 of the lower sprocket and stripper mechanism F, and then out of the lower portion of the projector and into a lower magazine or to the sound unit.

Before the film is positioned in the machine with respect to the above mentioned film handling elements, and in order that the threading of the film through the machine will be facilitated, the pad roller arm 4 of the upper film sprocket and stripper mechanism A is caused to be swung to its open position away from the sprocket wheels 13; the film gate C is placed in its retracted position away from the film trap B, as shown in Figure 2; the arm 92 of the intermittent film feeding mechanism E is caused to be swung to its open position as shown in Figure 13; and the pad roller arm 103 of the lower film sprocket and stripper mechanism is moved to its open position. After the film has been positioned in the machine with respect to the film handling elements, as above explained, the several above-mentioned devices of the film handling mechanism are caused to be swung into their respective closed operative positions with respect to the film, and as clearly illustrated in Figure 1, the projector is then in condition to automatically advance the film therethrough.

A detailed description of the construction and operation of the film sprocket mechanism, the film trap, the intermittent mechanism, and other parts of the motion picture projection machine illustrated in Figure 1 of the drawings, will not be set forth herein and the present description will be confined to the lens mount and film gate structures and the common support for the same which comprise the inventions claimed herein. The other above-mentioned mechanisms and their manner of operation have been fully illustrated and described by the same numerals as appear in Figure 1, in my co-pending application Serial No. 396,060, filed May 31, 1941.

Referring to the structures comprising the present invention, it will be noted by reference to Figure 1 of the drawings that the lens mount and film gate support is designated generally by the letter D, and the film gate structure is designated generally by the letter C. The support, in accordance with my invention, is made up as a single unit, and is held in position in the casing by means of the screws or bolts 27, and positioned by means of two dowel pins 27a so that the lens holder and film gate are accurately positioned at ninety degrees to the optical center line of the machine. Provision is also made for a horizontal slot 27b cut into holder D fitting these dowel pins, which allows the film gate and lens holder to be moved forward and back thus securing an optimum operating position of the film gate with the film trap. In the upper and lower portion of the lens mount and film gate support are the slidable bolts or rods 28, upon which are fixedly supported the lens mounting ring 29. The bolts 28 are slidably mounted in supports 29a and 30. The lens mounting ring may be adjusted as to position by means of the adjusting screw 31, which extends inwardly through the casing and is supported by the extension 30a of the lens mounting support, and operates in an internally threaded opening formed in the lower end of the lens mounting ring. The screw 31 is manipulated by the knob 32, positioned on the outside of the machine. It is intended that the screw 31 be provided with a double micrometer adjustment thread so that exceedingly critical adjustments of the lens mount may be effected.

The lens mount and film gate support is formed with an extension 33, which is adapted to slidably receive a cylindrical sleeve 34 therein. The sleeve 34 is adapted to have the film gate C mounted with respect thereto. The sleeve 34 is formed with a slot 35 in which is positioned a pin 36 and which is eccentric on the shaft 37 of a knob 38. The operation of the pin 36 in the slot 35 is similar to that of a crank, and when the knob is rotated the pin slides along said slot and causes the cylinder sleeve 34 to move forward and backward in the extension 33, and thus away from and toward the film trap B. In the cylindrical sleeve 34 there is also provided a slot 39 in which operates an eccentric stud 40, which is secured to the cylinder 33 of the lens and gate mount (see Figure 3). This slot and stud provides means for adjusting the cylinder sleeve 34 in a circular direction around the optical center of the sleeve extension 33.

A window or opening 41 (see Figure 1) is formed in cylinder sleeve 34 so that the interior thereof may be viewed by the operator if desired.

It will be noted that the lens and film gate mount assembly above described is made as one complete unit and may be removed as a unit from the interior of casing 2 without disturbing the other mechanism therein, merely by removing knob 32 from operative connection with the lens focusing screw, and then unscrewing the screws or bolts 27.

The film gate unit C is adapted to be removably mounted with respect to the end of the cylindrical sleeve 34 by means of the two studs 74, which will be described more in detail later on herein. The film gate construction is more clearly illustrated in Figures 4 and 4A, and referring first to Figure 4, it will be seen that the film gate is provided with a plate 42, having an opening 43 provided therein, through which the light beam of the projector may pass. At the upper and lower end edges of plate 42 there are provided the notches 44, and adjacent the opening 43 there are also provided the cut-away portions 45. The notches 44 and cut-away portions 45, are for the purpose of receiving therein the hooked ends 46 and 47 of the film pad shoes 48 and 49 of said film gate and so that said film shoes will be supported in proper resilient position with respect to said plate 42. The plate 42 is also provided with openings therethrough which receive the studs 50 and 58 which secure the film pad shoes 48 and 49 to said plate. Referring to Figure 4A which shows the reverse side of the film gate, the film plate 42 has pivotally secured thereto the plates 51 and 52. Plate 51 is pivotally secured to plate 42 at its upper portion 53 by means of the screw stud 54 and is further secured to said plate 42 and also to the film pad shoes 48 positioned on the other side of plate 42 by the studs 50 which extend through slotted portions 56 formed in plate 51. The plate 52 is pivotally secured to plate 42 by means of a screw 56a which is positioned in a slotted opening 57 formed in plate 52. Plate 52 is further secured to plate 42 and also to the film pad shoes 49 positioned on the other side of plate 42 by means of the studs 58 which extend through the slotted portions 59 formed in plate 52. The above described method of securing plates 51 and 52 to the plate 42 of the film gate and to the shoes 48 and 49 permits said plates and shoes to have a certain degree of play, and this provides for a pivoting or floating action for said plates and shoes.

Mounted at the rear face of the film gate plate 42, and as shown more clearly in Figures 1, 2 and 4A, are the threaded bolts or screws 60 and 61 which are provided with the knurled heads 62 and 63. The threaded bolt 60 extends through the plate 51, plate 42 and a plate 64 which has the film guide fingers 65 at the upper end thereof, and the spacing plate 66 positioned between the film pad shoes 38 and holds these parts in assembled relation. The screw threaded bolt 60 is comprised of a hexagonal bar 67 which is threaded at both ends. One end of said bar 67 is indicated at 68 and the other end at 69 in Figure 5. Mounted around said screw threaded bolt 60 is a spring 70 which is held in position with respect to plate 51 by means of the knurled knob 62. The screw threaded bolt 61 is similar in construction to the bolt 60 and extends through plate 52 at the portion indicated at 71, and through plate 42 at its lower extension 72 and holds plate 42 and plate 52 in yielding position with respect to each other due to the action of the spring 73 held in contact with plate 52 by means of the knurled head 63.

Mounted on the rear face of the film gate plate 42 are the studs 74 which provide the means for attaching the film gate unit to the cylinder sleeve 34 of the film gate mounting unit.

As above mentioned, at the upper portion of film gate plate 42 there is positioned and clamped between the said plate and plate 66, the plate 64 which is formed at its upper end with the guide fingers 65. These guide fingers are curved, as clearly indicated in Figures 1 and 2, so as to press against the film as it is fed through the machine and as it passes between the rollers 24 when the film gate is in its operative position with respect to the film trap. The film guide fingers 65 may be adjusted as to height by unscrewing bolt 60 and the adjusting screw 78 (see Figures 4 and 4A) which slidably holds the lower part of said guide finger plate in position with respect to plate 51 in an opening provided through plate 51.

The threaded bolts 60 and the screw 56a of the film gate construction also hold the spacing plates 66 and 76 in position on plate 42 and between the film pad shoes. These spacing plates are also secured to plate 42 by means of the screws 77 and 78. The spacing plates are provided for the purpose of preventing any accidental fire which may be started at the opening 43 in the film gate from spreading upwardly or downwardly along the film.

The function of the film pad shoes 48 and 49 of the film gate construction is to resiliently hold the film, as it is being fed through the machine, against the shoes of the film trap. The knurled heads 62 and 63 and the springs 70 and 73 associated with the bolts 60 and 61 provide means by which the tension of the film pad shoes 48 and 49 with respect to the film may be regulated.

Referring to Figure 5 it will be noted that there is provided on the cylinder 34 on which the film gate is adapted to be mounted, a threaded cone shaped bolt 77 which terminates in a knurled head 78. The bolt 77 is adapted to operate in a screw threaded opening in said cylinder and to contact with the reduced portion 79 of the lugs 74 mounted on the inner face of the film gate plate 42 and to position the film gate plate 42 in proper aligned operating position with respect to the cylinder. The operation of this cone shaped bolt or screw 77, when the pointed end thereof enters the reduced portion 79 of one of the lugs 74, is such that it acts to swing the other lug 74 of the plate 42 of the film gate into proper alignment within its receiving slot indicated at 80 in Figure 5.

The operation of the film gate unit after it has been positioned with respect to the cylinder 34 is as follows:

When it is desired to retract the film gate away from the film trap, the knob 38 is turned to the right (looking at the machine as shown in Figure 1), and pin 36 in slot 35 causes the cylinder sleeve 34 to move away from the film trap until the extension of pin 36 on the other side of flange a catches in hole b, in the bearing c, by spring tension (see Figure 3). To close the film gate with respect to the film trap, the knob 38 is forced inwardly and the crank action of the pin in slot 35 causes the cylinder sleeve 34 to move to the left or toward the film trap.

It will be noted that the film gate construction made in accordance with my invention operates in a suspended and floating condition and without any friction being produced upon the film as it runs through the machine and that it is provided with independent pairs of floating film pad shoes. Furthermore, the tension of said film pad shoes, may be quickly and easily regulated or adjusted while the projector is in operation so that there will be no binding action on the film when the film gate is in operative position with respect to the film trap.

While the lens mount and film gate structure and the common support therefor which form the subject matter of the present invention have been described in detail herein, and with respect to a present preferred form, it is to be understood that they are not to be limited to such details and form since many changes and modifications may be made in the same without departing from the spirit and scope of the invention. Hence it is desired to cover any and all forms and modifications of the invention which may come within the language or scope of any one or more of the appended claims.

I claim:

1. In a motion picture projection machine, a combined projection lens mount and film gate supporting means consisting of a cylindrical casing formed with apertured supporting means at the upper and lower portions thereof, bolts slidingly mounted in said apertured supporting means, a lens mount secured to said bolts, a threaded opening through the lower end of said lens mount, an adjusting screw mounted in said threaded opening in said lens mount, means for manipulating said screw for moving said lens mount and said bolts with respect to said lens mount and film gate supporting means, and means for removably securing said combined lens mount and film gate supporting means in said machine.

2. In a motion picture projection machine, a combined projection lens mount and film gate supporting means consisting of a cylindrical casing formed with apertured supporting means at the upper and lower portions thereof, bolts slidingly mounted in said apertured supporting means, a lens mount secured to said bolts, a threaded opening through the lower end of said lens mount, an adjusting screw adapted to operate in said threaded opening, means for manipulating said screw for moving said lens mount, film gate supporting means slidingly positioned in said cylindrical casing, and means for moving said film gate supporting means with respect to said casing.

3. In a motion picture projection machine, a film gate construction comprising a supporting plate, upper and lower pressure shoes positioned on the front face of said supporting plate, a pair of plate members pivotally secured to the back face of said supporting plate and provided with means extending through said supporting plate to pivotally secure each of said shoes on said supporting plate so that each shoe individually is adapted to align itself to variations of the film, and means associated with said plate members and said supporting plate for yieldingly maintaining said shoes in position with respect to the front face of said supporting plate.

4. In a motion picture projection machine, a film gate construction comprising a supporting plate having an opening formed therein, upper and lower pressure shoes positioned in the front face of said supporting plate and formed with hooked ends for embracing the upper and lower end edges of said plate and the upper and lower edges of the opening therein, and for maintaining alignment of said shoes in a line parallel to the direction of the travel of the film, plate members pivotally secured to the back face of said supporting plate and having means slidingly extending through said supporting plate for securing said shoes to said supporting plate, means mounted on the back of said supporting plate for holding said plate members in yielding position with respect to said supporting plate and so that said shoes will be yieldingly supported with respect to the front face of the supporting plate.

5. In a motion picture projection machine, a film gate construction comprising a supporting plate having an opening formed therein, upper and lower pressure shoes positioned on the front face of said supporting plate and formed with hooked ends for embracing the upper and lower end edges of said plate and the upper and lower edges of said opening, and for maintaining alignment of said shoes in a line parallel to the direction of the travel of the film, plate members pivotally secured to the back face of said supporting plate and having means slidingly extending through said supporting plate for securing said shoes to said supporting plate, means associated with said plate members and said supporting plate for yieldingly maintaining said shoes in position with respect to said supporting plate, and means mounted on the back face of said supporting plate for removably attaching said film gate construction to a support in said machine.

6. In a motion picture projection machine, a film gate construction comprising a supporting plate having an opening formed therein, upper and lower pressure shoes positioned on the front face of said supporting plate, a pair of plate members pivotally secured to the back face of said supporting plate and provided with means slidingly extending through said supporting plate to secure said shoes to said supporting plate, means associated with said plate members and said supporting plate for yieldingly maintaining said shoes in position with respect to the front face of the supporting plate, means mounted on the back face of the supporting plate for removably attaching said film gate construction to a support in said machine, and spacing fire shield plates secured to the front face of said supporting plate and positioned between said shoes.

7. In a motion picture projection machine, a film gate construction comprising a supporting plate having an opening formed therein, a pair of upper pressure shoes, and a pair of lower pressure shoes positioned on the front face of said supporting plate, said upper pair of pressure shoes extending on either side of said opening, said lower pair of pressure shoes extending in spaced relation and in continuation of said upper shoes, a plate member pivotally mounted on the back face of said supporting plate at the upper portion thereof and having means slidingly extending through said supporting plate to secure said upper pair of shoes to said supporting plate, a plate member pivotally mounted on the back face of said supporting plate at its lower portion and having means slidingly extending through said supporting plate to secure said lower pair of shoes to said supporting plate, and means associated with said plate members and said supporting plate for yieldingly maintaining said upper and lower pairs of shoes in position with respect to the front face of said supporting plate.

8. In a motion picture projection machine, a film gate construction comprising a supporting plate having an opening formed therein, pressure shoes positioned on either side of said opening and on the front face of said supporting plate, means pivotally secured to the back face of said supporting plate and movably connected to each of said pressure shoes to individually pivotally mount the same on the front face of said supporting plate, so that said shoes are each individually capable of self alignment to variations of the film and means associated with said last mentioned means and said supporting plate to yieldingly maintain said shoes in position with respect to the front face of said supporting plate.

9. In a motion picture projection machine, a film gate construction comprising a supporting plate having an opening formed therein, upper and lower pressure shoes positioned on the front face of said plate, a pair of upper and lower plate members pivotally secured to the back face of said supporting plate and provided with means slidingly extending through said supporting plate for securing said shoes to said supporting plate, means associated with said plate members and said supporting plate for yieldingly maintaining said shoes in position with respect to the front face of said supporting plate, upper and lower fire shield plates secured to the front face of said supporting plate and on either side of the opening therein, a plate provided with film guide fingers positioned between said supporting plate and said upper fire shield plate and secured between said supporting plate and said fire shield plate by means extending through said upper back plate member and said supporting plate.

10. In a motion picture projection machine, a film gate construction comprising a supporting plate having an opening formed therein and having spaced notches formed in the upper and lower edges thereof and spaced cut-away portions in the lower edges of said opening, pairs of upper and lower pressure shoes having hooked ends positioned on the front face of said plate and on either side of said opening and so that the hooked ends thereof will be positioned in said notches of said plate and the cut-away portion of said opening, upper and lower plate members pivotally secured to the back face of said supporting plate and having sliding means extending through the supporting plate for securing said upper and lower pressure shoes to said supporting plate, and means associated with said plate members and said supporting plate for yieldingly maintaining said shoes in position with respect to the front face of said supporting plate.

11. In a motion picture projection machine, a film gate construction comprising a support having an opening therein, pressure shoes positioned on the front of said support and on either side of said opening and each individually pivotally secured to said support by plate means pivotally mounted on the back of the support so that each of said shoes are capable of self-alignment to variations of the film means associated with said pivoted plate means for yieldingly maintaining said shoes in their position with respect to said support, and means on said support for detachably attaching the film gate construction to a support in the machine.

12. In a motion picture projection machine having film feeding mechanisms mounted therein for feeding film therethrough for projection including a film trap and a film gate, a mounting support for the film gate, means associated with the support for detachably securing the film gate to the same and for correctly positioning the same with respect thereto and with the film trap, means provided in said support for withdrawing same under tension away from said film trap, means to lock said film gate support against movement in withdrawn position and means for releasing said film gate support from its open locked condition and so that it will automatically position said film gate in operative relation to said film trap under the action of said tensioning means, and locking said film gate in this position against movement.

13. In a motion picture projection machine, a combined lens mount and film gate support, a lens mounting ring secured to spaced rods slidably carried by said support, means for laterally adjusting the position of said lens mount with respect to said support, a film gate mounting means slidingly carried by said support, a film gate detachably mounted on said film gate mounting means, and means associated with the support and said film gate mounting means for adjusting the position of the film gate and its mounting means.

14. In a motion picture projection machine, a combined film gate and lens mount support, slidable means mounted on said support, a lens mounting ring fixedly secured to said slidable means, means cooperating with said lens mount and said support for laterally adjusting the position of said lens mount with respect to said support, a film gate mounting means slidably positioned in said support, a film gate detachably secured to the free end of said film gate mounting means, and means for adjusting the position of said film gate mounting means with respect to said support.

15. In a motion picture projection machine, a combined film gate and lens mount support adapted to be removably mounted as a unit in said machine, a lens mount slidably mounted on said support, means for adjustably positioning said lens mount with respect to said support, a film gate mounting means slidingly carried in said support, a film gate detachably mounted on the film gate mounting means, and means for adjusting the support so that the film gate will be accurately aligned to the center line of the film.

16. In a motion picture projection machine, a combined film gate and lens mount support, slidable means carried by said support, a lens mount fixedly secured to said slidable means, means cooperating with said lens mount and said support for positioning the lens mount with respect to the support, a film gate mounting means slidably received in said support, a film gate detachably secured to said film gate mounting means, means for moving said film gate mounting means a predetermined distance within said support and locking the same against movement, and means for adjusting the support after it is mounted in the machine to accurately align the film gate to the center line of the film.

17. In a motion picture projection machine provided with film feeding mechanism including a film trap, a combined lens mount and film gate support, laterally sliding bolts positioned on said support, a lens mount fixedly secured to said bolts and slidable therewith, means for laterally positioning said lens mount with respect to said support, a film gate mounting means having lateral sliding movement with respect to said support, a film gate removably supported on said film gate mounting means, and means cooperating with said support and said film gate mounting means for moving the film gate towards and retracting it from said film trap, means for locking said film trap in its retracted position and means for adjusting the support after it is mounted in the machine to accurately align the film gate to the center line of the film.

18. In a motion picture projection machine provided with film feeding mechanisms including a film trap, a removable combined lens mount and film gate support consisting of a cylindrical casing, slidable means mounted on said casing, a lens mount secured to said slidable means and adapted to be laterally positioned with respect to said support casing, a cylindrical sleeve slidingly supported in said casing, a film gate detachably mounted on the free end of said cylindrical sleeve, means cooperating with said cylindrical casing support and said sleeve for moving said sleeve and said film gate with respect to said cylindrical casing support, and means for positioning the film gate on said sleeve in an optimum operating position with respect to the film trap of the machine.

EWALD BOECKING.